(No Model.)
C. HOEPFNER.
ELECTROLYTIC PRODUCTION OF METALS.
No. 507,130. Patented Oct. 24, 1893.
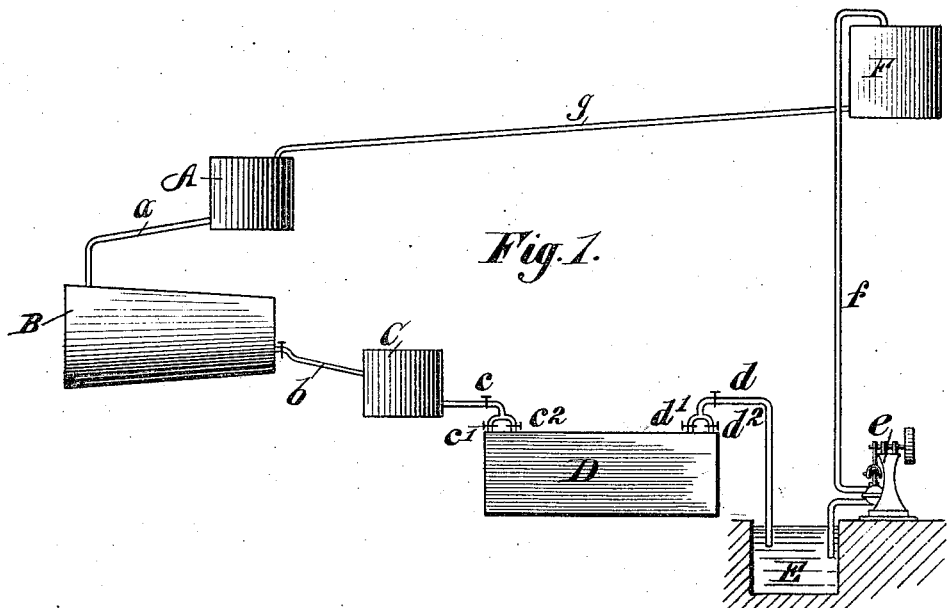
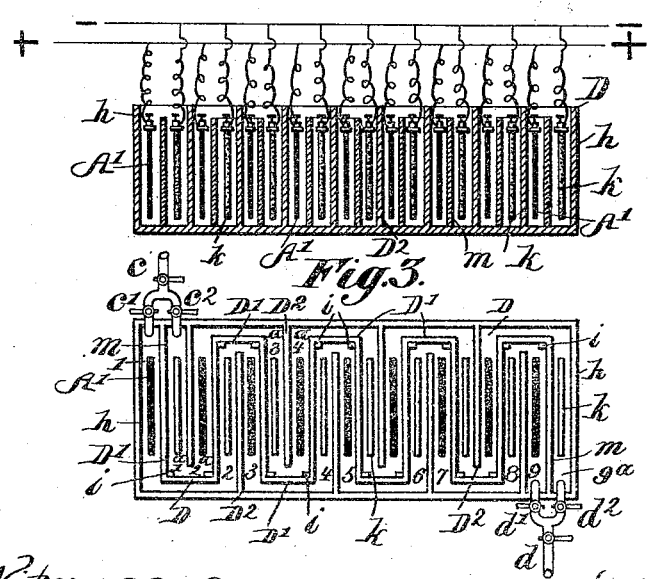

UNITED STATES PATENT OFFICE.

CARL HOEPFNER, OF BERLIN, GERMANY.

ELECTROLYTIC PRODUCTION OF METALS.

SPECIFICATION forming part of Letters Patent No. 507,130, dated October 24, 1893.

Application filed July 16, 1888. Serial No. 280,091. (No specimens.) Patented in England April 23, 1885, No. 6,736, and in Germany March 2, 1888, No. 53,782.

*To all whom it may concern:*

Be it known that I, CARL HOEPFNER, doctor of philosophy and chemist, a subject of the King of Prussia and German Emperor, residing at Berlin, in the Kingdom of Prussia and German Empire, have invented certain new and useful Improvements in the Electrolytic Production of Metals, (for which patents have been obtained in Great Britain, No. 6,736, dated April 23, 1885, and in Germany, No. 53,782, dated March 2, 1888;) and I do hereby declare the following to be a full, clear, and exact description of the invention, such as will enable others skilled in the art to which it appertains to make and use the same.

The invention relates to the extraction of metals from their ores, or from matte, or other materials, and is designed more especially for the extraction of copper or copper and silver free from other metals allied thereto and usually found in cupriferous and argentiferous ores or pyrites.

The invention has for its object the provision of a simple and economical mode of extracting these metals, and it consists in the method or process of extracting the metals referred to, as will now be fully described.

In carrying out my invention I proceed as follows: I first form a solution of cupric chloride ($CuCl_2$) by means of a solvent of cuprous chloride and chloride of silver, as for instance, by dissolving the cupric chloride in a saturated solution of chloride of sodium, calcium, or magnesium. The ore, matte or pyrites are reduced preferably to a pulverulent condition and are then leached out with the cupric chloride solution, whereby the latter is converted into a cuprous chloride solution. Such metals as copper, silver, lead, &c., especially when present in the material treated in the form of sulphides, are readily dissolved by the cupric chloride solution and the latter is converted into a cuprous chloride solution according to the following equations:

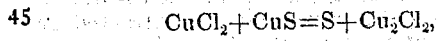

or

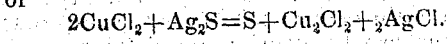

Should the material treated contain copper in the form of an oxide, a sufficient quantity of acid or other solvent is added to the cuprous chloride solution, care being had that the whole of the cupric chloride present is first converted into cuprous chloride. If the cuprous chloride solution thus obtained contains copper only, or copper and silver, the latter may be eliminated by precipitation, either by means of metallic copper or by means of sulphide of copper, introduced into the cuprous chloride solution which is kept agitated so as to bring the whole of the solution in contact with the precipitant, the silver being obtained in a metallic form if metallic copper is used, or in the form of a sulphide if sulphide of copper is used as a precipitant, a quantity of copper equal to that of the silver precipitated being dissolved and taking the place of the silver in the cuprous chloride solution. The silver may, however, be extracted from the cuprous chloride solution, and hereinafter called the electrolyte, simultaneously with the copper by electrolysis. To this end the electrolyte is rapidly passed through series of anode and cathode cells of an electrolytic apparatus hereinafter called the electrolyzer, whereby silver only will be deposited at the cathodes first brought into contact with the electrolyte, while the copper will be deposited at the succeeding cathodes, these metals being deposited in the order of their position in the electrolytic series. In this electrolytic separation of the copper and silver the electrolyte is supplied to the anode and cathode cells in two separate streams, the cells of unlike name being separated from each other by a diaphragm impermeable to the electrolyte but affording free passage to the electric current. As stated the metals, silver and copper, will be deposited at the cathodes, while the electrolyte at the anodes will be converted by the chlorine liberated, from a cuprous to a cupric chloride solution, which is afterward mixed with the solution flowing from the cathodes for use as a leaching agent in the treatment of fresh materials, the solution flowing from the cathodes being substantially free from metals. The chlorine liberated at the anode acts in *statu nascendi*, resulting in the generation of electro-motive force that is not only favorable to but assists in the separation or extraction of the metals and the conversion of the electrolyte.

Inasmuch as the electrolyte obtained in the manner set forth from materials such as described almost invariably contains, besides copper and silver, other metals usually associated with the latter, such as iron, lead, arsenic, antimony, bismuth, cobalt, &c., these may be obtained with the copper, or the copper and silver in the form of alloys by electrolysis, or in a more or less pure state by passing the electrolyte, as described in reference to the electrolytic separation of silver from copper, rapidly through a series of anode and cathode cells, the metals being deposited at the cathodes in the order of their position in the electrolytic series. I prefer, however, to free the electrolyte from these metals in order to obtain metallic copper or copper and silver in a pure state, and this may be effected by any suitable precipitant, as for instance carbonate of lime, the proportion of the precipitant depending upon the proportion of undesirable metals contained in the electrolyte, which is determined by analysis. The separation or precipitation of the undesirable metals by means of carbonate of lime is readily effected for the reason that said metals will be acted upon by the lime before the copper and silver, and for the further reason that the quantity of lime used is proportionate to that of said undesirable metals, thus leaving the copper or the copper and silver in the solution unaffected.

Of course any solution containing copper or copper and silver and other metals such as referred to, may be treated with carbonate of lime, but this treatment is more especially applicable to solutions of cuprous chloride.

Inasmuch as cupriferous ores contain more or less iron which may enter into solution in the preparation of the electrolyte, the repeated use of the regenerated cupric chloride solution would result in an accumulation of an excess of iron, which is undesirable. This is also avoided by treatment of the electrolyte with carbonate of lime. The removal of the iron may also be effected by injecting air or oxygen into the electrolyte, which results in the formation of oxychloride of copper that acts as a precipitant for the oxide of iron, but a small quantity of copper, comparatively speaking, being necessary. This reaction takes place according to the following equation:

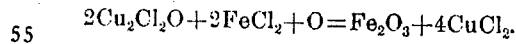

$$2Cu_2Cl_2O + 2FeCl_2 + O = Fe_2O_3 + 4CuCl_2.$$

This tendency of the cuprous chloride to oxidize when exposed to air may also be taken advantage of for regenerating the cupric chloride by the aid of an acid, this reaction taking place as follows:

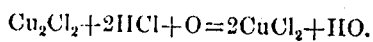

$$Cu_2Cl_2 + 2HCl + O = 2CuCl_2 + HO.$$

The acidulation may be effected by the addition in the presence of air, of sulphurous acid, to the solution of cupric chloride.

Instead of carbonate of lime, caustic alkalies or alkaline earths or their carbonates or oxides or carbonates of metals, as for instance of copper, may be employed in the separation of the undesirable metals from the electrolyte, the metals being precipitated according to the precipitant used in the form of oxides, or in the form of arsenate and antimonate of iron or copper, the arsenic and antimony being present in the solution in the form of arsenious and antimonious acids, or arsenic and antimonic acids which are converted by the precipitant into insoluble arsenic and antimonic salts; while if an oxide or carbonate of copper is used the arsenic and antimony are converted into insoluble arsenate or arsenite of copper and the corresponding salts of antimony. Inasmuch as the electrolyte contains copper it may readily happen that the salts last referred to will be formed without the use of a copper salt when lime or an alkali is used as a precipitant. In either case but a comparatively small proportion of copper goes over with the precipitant, which quantity is in no case greater than the quantity of the arsenic and antimonic salts precipitated, so that but an unappreciable quantity of copper is lost.

That the undesirable metals referred to may be effectually eliminated from the electrolyte in the manner described and before the electrolyte is subjected to the action of the electric current without affecting either the copper or the silver, whenever the latter is present in the solution treated, has been fully demonstrated by practice on a large scale, care being had to regulate the quantity or proportion of the precipitant according to the quantity or proportion of such undesirable metals present in the electrolyte, so that a solution containing copper or copper and silver only, is obtained as an electrolyte from which the silver may be separated in a substantially pure form by electrolysis in the manner above set forth, or said silver may be removed from the electrolyte by precipitation as described, before the electrolyte is subjected to electrolysis.

The described process possesses many advantages, some of which are of great importance. Thus, for instance, copper from low grade copper ores, or matte, or other cupriferous materials poor in copper can be readily and remuneratively obtained in a simple manner. On the other hand, a saving in electrical energy is also effected, since one ampère will deposit or precipitate twice as much copper from a cuprous as from a cupric solution, and when such cuprous solution is previously freed from the salts of objectionable metals as described, pure copper will be the result.

When cupriferous ores containing silver, or argentiferous ores are treated according to my process, the silver can be extracted or separated at a comparatively small expense, while in the case of rebellious argentiferous ores the usual expensive chloridizing roasting is dispensed with, as well as the losses in quicksilver or sulphate of copper in the subsequent amalgamation of the roasted ores, which losses render the process of amalgamation so costly.

Any suitable apparatus may be employed in carrying out my invention, such apparatus being shown in the accompanying drawings, in which—

Figure 1 is a sectional elevation, more or less diagrammatic, of such an apparatus, and Fig. 2 is a longitudinal vertical section, and Fig. 3 a top plan view of the electrolyzer.

A indicates the reservoir for the cupric chloride solutions, which reservoir is connected with the leaching vat, B, by pipe, $a$, said vat containing the cupriferous or argentiferous material to be leached. The leaching vat, B, is connected with a settling tank, C, by pipe, $b$, and said tank is connected with the first pair of cells of unlike name of the electrolyzer D, through the branched pipe, $c$. A similar branched pipe, $d$, conducts the cupric chloride solution from the last of the anode cells, and the solution free from metals from the last of the cathode cells of the series into a reservoir, E, where the two liquids commingle and are pumped by a pump, $e$, through pipe, $f$, into a collecting tank, F, from whence the liquid is conducted through pipe, $g$, back to reservoir, A As shown in Fig. 3, the electrolyte passes from tank, C, through pipe, $c$, and its two branches, $c'$, $c''$, into the first pair of anode and cathode cells of the electrolyzer, D, said cells being separated from each other by diaphragms, D$'$, that are impermeable to the electrolyte but not to the electric current, said diaphragms being secured to posts, $i$, while the cathode cells are separated by partitions D$^2$, extending from the opposite inclosing walls, $h$, of the electrolyzer toward the end walls of the diaphragms, D$'$. It will be seen that the electrolyte flowing into the first anode cell, 1, through branch, $c'$, of pipe, $c$, passes around the two adjacent cathode cells, 1$^a$, 2$^a$, into anode cell, 2, in an opposite direction, thence through the adjacent anode cell, 3, and so on through the remaining anode cells, 3, 4, 5, &c., to the last cell, 9, of the series, and thence through branch, $d'$, of pipe, $d$, into the reservoir, E, that portion of the electrolyte pursuing a zigzag course through the electrolyzer. The same is the case with that portion of the electrolyte supplied to the cathode cells through branch, $c''$, of pipe, $c$, the electrolyte flowing into the first cathode cell, 1$^a$, thence around the partition, D$^2$, through cathode cell, 2$^a$, and so on to the last of the cathode cells, 9$^a$, of the series, and thence through branch, $d''$, of pipe, $d$, into reservoir, E, the anodes, A$'$, and cathodes, $k$, of the electrolyzer being made of carbon and sheet copper respectively.

I have hereinbefore stated that the diaphragms D$'$ should be made of a material impermeable to the electrolyte but not to the electric current, and I prefer to employ diaphragms made of parchment paper reinforced on one or both sides by a textile fabric or leather, veneer, gelatine, asbestos, or the like, as described in my application for Letters Patent of the United States, Serial No. 378,616, filed January 21, 1891.

In the described electrolyzer cells of like name are connected up in series in a manner well understood in the art, and I have deemed it unnecessary to illustrate or describe in detail the electrical connections.

Having thus described my invention, what I claim as new therein, and desire to secure by Letters Patent, is—

1. The herein described process of obtaining copper, which consists in first forming a cuprous chlorid solution such as described by leaching a cupriferous material with a cupric chlorid solution containing a solvent for cuprous chlorid, electrolyzing the cuprous chlorid solution so obtained and preventing the solution at the anode from commingling with the solution at the cathode, whereby the cuprous chlorid at the anode is reconverted into cupric chlorid, substantially as set forth.

2. The herein described process of obtaining copper, which consists in first forming a cuprous chlorid solution by leaching a cupriferous material with a cupric chlorid solution containing a solvent for cuprous chlorid, electrolyzing the cuprous chlorid solution so obtained, preventing the solution about the anode from commingling with the solution about the cathode, and mixing together the electrolytic solutions after having been acted upon by the electric current for the purpose specified, whereby the cuprous chlorid at the anode is reconverted into cupric chlorid, substantially as set forth.

3. The herein described process of obtaining copper and silver free from other metals, which consists in first forming a cuprous chlorid solution of these metals by leaching a cupriferous and argentiferous material with a cupric chlorid solution containing a solvent for cuprous chlorid, separating from the cuprous chlorid solution so obtained such metals as iron, arsenic, antimony, cobalt, &c., then extracting the silver by precipitation, and lastly electrolyzing the cuprous chlorid solution, and preventing the solution at the anode from commingling with the solution at the cathode for the purpose specified, whereby the cuprous chlorid at the anodes is reconverted into cupric chlorid, substantially as set forth.

4. The herein described process of obtaining copper and silver free from other metals, which consists in first forming a cuprous chlorid solution of these metals by leaching a cupriferous and argentiferous material with a cupric chlorid solution containing a solvent for cuprous chlorid, separating from the cuprous chlorid solution so obtained such metals as iron, arsenic, antimony, cobalt, &c., then extracting the silver by precipitation, and lastly electrolyzing the cuprous chlorid solution, and preventing the solution at the anode from commingling with the solution at the cathode, and mixing together the two solutions after having been acted upon by the electric current, for the purpose specified, whereby the cuprous chlorid at the anode is reconverted into cupric chlorid, substantially as set forth.

5. The herein described process of obtaining copper, which consists in first forming a cuprous chlorid solution by leaching a cupriferous material with a cupric chlorid solution containing a solvent for cuprous chlorid, electrolyzing the cuprous chlorid solution so obtained, preventing the solution about the anode from commingling with the solution about the cathode, mixing together the electrolytic solutions after having been acted upon by the electric current, and preventing an accumulation of iron therein by oxidizing and removing the latter, substantially as and for the purpose set forth.

6. The herein described process of obtaining copper and silver free from other metals, which consists in forming a cuprous chlorid solution of these metals by leaching a cupriferous and argentiferous material with a cupric chlorid solution containing a solvent for cuprous chlorid as described, separating from the cuprous chlorid solution so obtained such metals as arsenic, antimony, cobalt, &c., extracting the silver by precipitation, electrolyzing the cuprous chlorid solution, preventing the solution at the anode from commingling with the solution at the cathode, mixing together the two solutions after having been acted upon by the electric current and preventing an accumulation of iron therein by oxidizing and removing the latter, substantially as and for the purpose set forth.

In testimony whereof I affix my signature in presence of two witnesses.

CARL HOEPFNER.

Witnesses:
MARC M. ROTTEN,
B. ROI.